United States Patent [19]

Svoboda et al.

[11] 4,263,806
[45] Apr. 28, 1981

[54] DEVICE FOR MEASURING THE RELEASE FORCE OF SKI BINDINGS

[75] Inventors: Josef Svoboda; Rupert Hofbauer, both of Schwechat, Austria

[73] Assignee: TMC Corporation, Switzerland

[21] Appl. No.: 14,272

[22] Filed: Feb. 22, 1979

[30] Foreign Application Priority Data

Feb. 22, 1978 [AT] Austria .................................. 1298/78

[51] Int. Cl.³ .............................................. G01L 5/03
[52] U.S. Cl. ................................................. 73/133 A
[58] Field of Search ..................................... 73/133 A

[56] References Cited

U.S. PATENT DOCUMENTS 3,861,205  1/1975  Frey et al. .......................... 73/133 A

FOREIGN PATENT DOCUMENTS 2620107  11/1977  Fed. Rep. of Germany ........ 73/133 A Primary Examiner—Charles A. Ruehl Attorney, Agent, or Firm—Blanchard, Flynn, Thiel, Boutell & Tanis

[57] ABSTRACT

A device for measuring the release force of ski bindings mounted on a ski having a first device for fixedly holding the ski and a second device for adjustably loading through an output member the ski boot. The ski boot is connected to the fixed ski through the safety ski binding. A plate assembly is provided for initially receiving the ski boot thereon. The plate assembly has a first part which is movably supported against the force of a spring. A translating mechanism is connected to the movable first part of the plate assembly, and indicates during the testing procedure the centerpoint or a mark on the ski boot or the ski. The translating mechanism also effects an automatic proportional adjustment of the second device relative to the mark. The measured values are generated by at least one wire strain gauge and fed to an electronic measuring-, balancing-, indicating device for evaluation, comparison with stored desired values and meaningful interpretation by the issuance of a signal.

15 Claims, 7 Drawing Figures

DEVICE FOR MEASURING THE RELEASE FORCE OF SKI BINDINGS

FIELD OF THE INVENTION

The invention relates to a device for adjusting safety ski bindings which are mounted on a ski or for testing the adjustment of such safety ski bindings by utilizing means for fixedly holding at least one ski and at least one loading member having an output member, the working force of which can be adjusted, which output member engages the ski boot connected to the fixedly held ski by safety ski bindings and applies a force to the ski boot to effect a release of the ski binding.

BACKGROUND OF THE INVENTION

Such a device is described for example in Swiss Pat. No. 394 005. Test values can be found in this known construction, which values can be individually determined in relation to predetermined factors governing the required release forces; however, it is not possible to associate the release operations which relate to the individual release values for different ski boot lengths with a predetermined position of the ski. For this reason, the actual values are not associated with a common basis and cannot be compared with one another.

Furthermore, various devices are known, which describe a certain detail of a testing device of this type. Reference can be made in this connection to U.S. Pat. No. 3,861,205 or to U.S. Pat. No. 3,621,712. The first reference discusses hydraulic holding devices for arranging the ski on the testing device, the second reference describes a hydraulically operable device for measuring the sideward or frontal release. Comparable values for different length ski boots cannot be determined by measurements made with these devices.

The purpose of the invention is to solve the foregoing problem and design a device of the above-mentioned type such that test values having a uniform basis can be detected for different length ski boots, and the characteristics of the ski boots are automatically inter-related during the determination of the test values.

The set purpose is inventively attained by a plate assembly being provided for receiving the ski boot therein and which is to be used for the testing procedure, which plate assembly has a part which can be moved against a spring force, and by connecting a translating mechanism to the movable part of the plate assembly on which mechanism during the testing the centerpoint of a ski boot, possibly ski, which is arranged in the device parallel to and approximately in the plane of the plate assembly, can be automatically adjusted and can be held down centered, can be adjusted proportionally, and the actual values measured can be fed through at least one wire strain guage to an electronic measuring-, balancing-, indicating device, and evaluated, can be compared with stored desired values and can be indicated meaningfully by the issuance of a signal.

Through the inventive structure, it is possible not only to determine a value which corresponds to every common ski boot on one common basis, but it can be accomplished meaningfully at the same time by a device which produces signals, whether the adjusted value is correct or whether this value differs from the desired value beyond a certain tolerance, furthermore in which direction the correction of the adjustment must be made in order to enable one to obtain a correct value.

Further details, advantages and inventive characteristics are described more in detail with reference to the drawings, which illustrate one exemplary embodiment.

DETAILED DESCRIPTION

Figure 2:
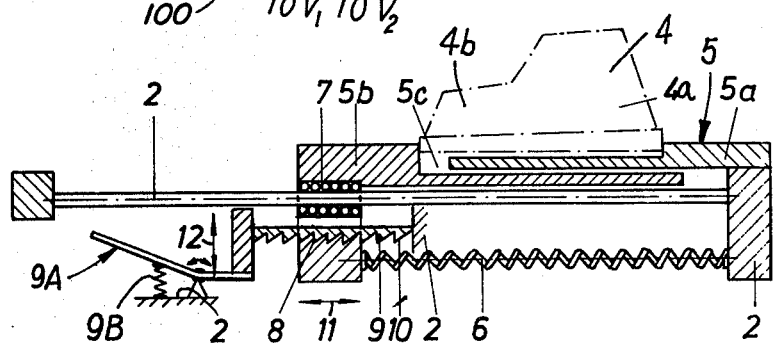
FIG. 2 is a cross-sectional view taken along the line II—II of FIG. 1.

An inventive device which as a whole is identified by the reference numeral 1 has an elongated and enclosed frame 2, of which here for a better understanding only portions thereof are shown. All figures will identify, in order to be uniform, frame parts or structural parts fixed to the frame by the common reference numeral 2, especially if these parts by themselves, aside from the support therefor, perform no separate function. The longitudinal axis of a ski 3 which is only schematically indicated in broken lines and a ski boot 4 both extend parallel to the longitudinal axis of one side of the frame 2. An elongated plate assembly 5 is mounted on the frame 2 and the longitudinal axis thereof extends parallel to the aforesaid one side of the frame 2 and the longitudinal axis of the ski 3. The plate assembly 5 is composed of two parts 5a and 5b. An elongated depression 5c is provided in both parts of the plate assembly 5 and the axis thereof extends parallel with respect to the ski 3 and in the elevational direction lies approximately in the plane of the ski 3. The rear part 5a of the plate assembly 5 associated with the heel 4a of the ski boot 4 is fixedly connected to the frame 2, however, the front part 5b of the plate assembly 5 associated with the toe 4b of the ski boot 4 can be adjusted in longitudinal direction of the ski boot 4 and thus also in longitudinal direction of the ski 3 against the force of a spring 6 (compare FIG. 2). The movable part 5b of the plate assembly 5 has for this purpose a ball bearing support 7 which travels along a guide rail 2a on the frame 2. The movable part 5b of the plate assembly 5 also has saw teeth 8 positioned thereunderneath on a part thereof and on which is engaged one end of the spring 6. A saw toothed bar 9 having saw teeth 10 thereon is provided on the frame 2 and engages and disengages the saw teeth 8. The saw teeth 8 and 10 are formed such that during an adjustment the teeth prevent movement of the front part 5b toward the heel part 5a; however, by moving the front part 5a forwardly (to the left in FIG. 2) the saw teeth 8 can be moved over the saw teeth 10 on the toothed bar 9 and the front part 5b will separate from the rear part 5a. The toothed bar 9 is supported for movement in the vertical direction relative to the frame 2 such that the teeth 10 will become disengaged from the teeth 8 on the movable part 5b of the plate assembly 5, after which the movable part 5b due to the return force of the spring 6 is returned into a position which corresponds to the smallest length ski boot. The adjustability of the movable part 5b of the plate assembly 5 is schematically indicated by the double arrow 11, the vertical movement of the toothed bar 9 is schematically indicated by the double arrow 12. A lifting linkage 9A is provided on the frame 2 of the device 1 for the purpose of facilitating a disengagement of the toothed bar 9 from engagement with the teeth 8, which lifting linkage effects a compressing of a spring 9B and thus carries out a lifting off of the toothed bar 9 from the saw teeth 8 of the movable part 5b of the plate assembly 5 against the force of the spring 9B. FIG. 2 only indicates that the toothed bar 9 is supported nonmovably in longitudinal direction of the ski boot 4 on the frame 2.

Figure 1:
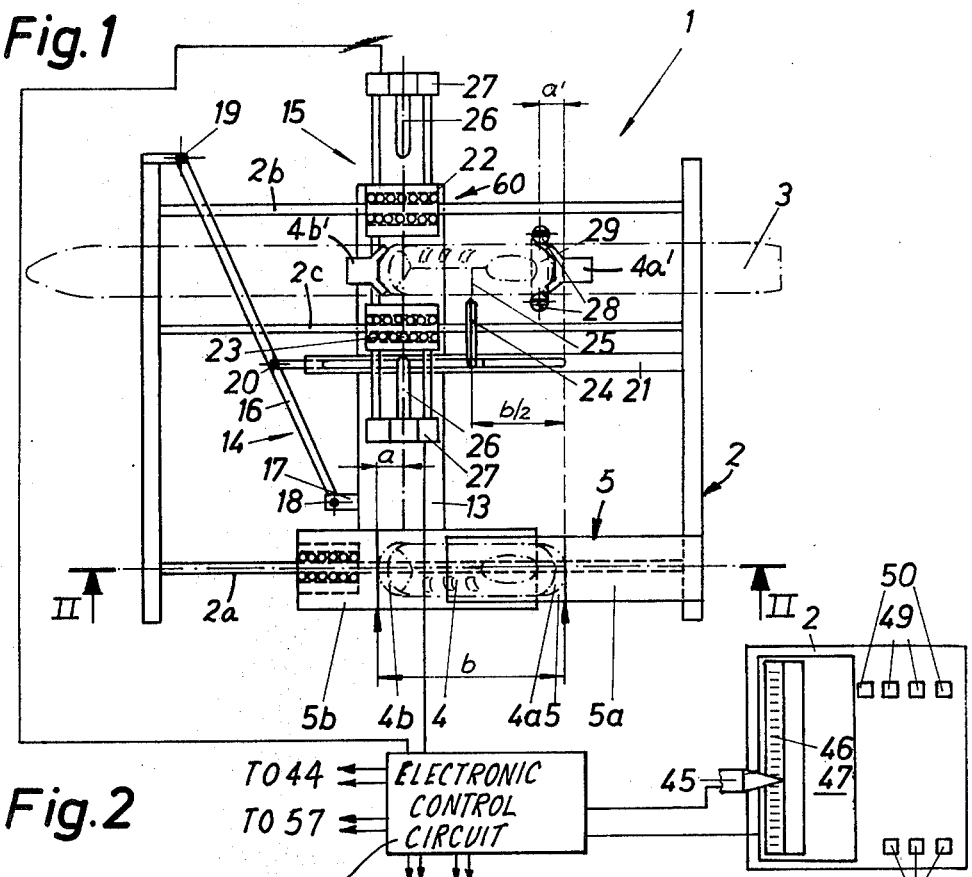
FIG. 1 is a top view of the device embodying the invention.

As one will recognize from FIG. 1, a carriage 13 is fixedly associated with the movable part 5b of the plate assembly 5, which carriage has a translating mechanism 14 and a lateral thrust measuring device 15 mounted thereon which determines the lateral release forces. The translating mechanism 14 has a first linkage 16, which is hingedly connected with its one end to an extension 17 on the carriage 13 and with its other end to the frame 2, each through a pivotal joint 18, 19, respectively. The linkage 16 has a further pivotal joint 20 thereon, to which a further linkage 21 is connected. The frame 2 has a pair of parallel guide rails 2b and 2c extending parallel to the guide rail 2a. The carriage 13 has a pair of ball bearing housings 22 and 23 which receive the guide rails 2b and 2c, respectively, therethrough to movably support the carriage 13. The linkage 21 has a pointer 24 thereon which becomes aligned with a mark 25 which is provided on the ski boot 4, possibly also on the ski 3, when the ski boot 4 and ski 3 are correctly aligned. Furthermore, two rams 26 are provided, which can be selectively operated in a direction toward and away from the central longitudinal axis of the ski. The two rams 26 are each arranged on a mounting member 27 which will be described more in detail below, which mounting members 27 are adjustable in a vertical direction relative to the frame 2. Two vertically extending posts 28 are provided in the heel area 4a of the ski boot 4, onto which posts a heel tensioning means 29 is provided, which is here only schematically indicated. The heel tensioning means is a bar which has a U-shaped cross section. Further details of these devices will be discussed with reference to FIGS. 3 and 4. It is further mentioned with reference to FIG. 1, that the linkage 16 is designed such that an adjustment of the movable part 5b of the plate assembly 5 to a distance "b" will correspond to a distance of "b/2" on the pointer 24. However, the distance "a" of the two rams 26 from the toe of the ski boot 4 or the part 5b of the plate assembly 5 and the distance "a'" of the posts 28 from the rear part 5a of the plate assembly 5 remains constant, so that all measured values always refer to the same distance from the ski boot toe and ski boot heel.

No special discussion is needed to state that the ski boot 4 is guided with the toe onto the plate assembly 5, so that the movable part 5b of the plate assembly is brought into the respectively desired position corresponding to the desired position of the ski boot. Since in this position, the movable part 5b is automatically fixed by the teeth 8, 10, the ski boot 4 can be removed from the plate and can be moved into a parallel position on the ski 3 which is shown in dash-dotted lines in FIG. 1 and the mark thereon aligned with the pointer 24.

Figure 3:
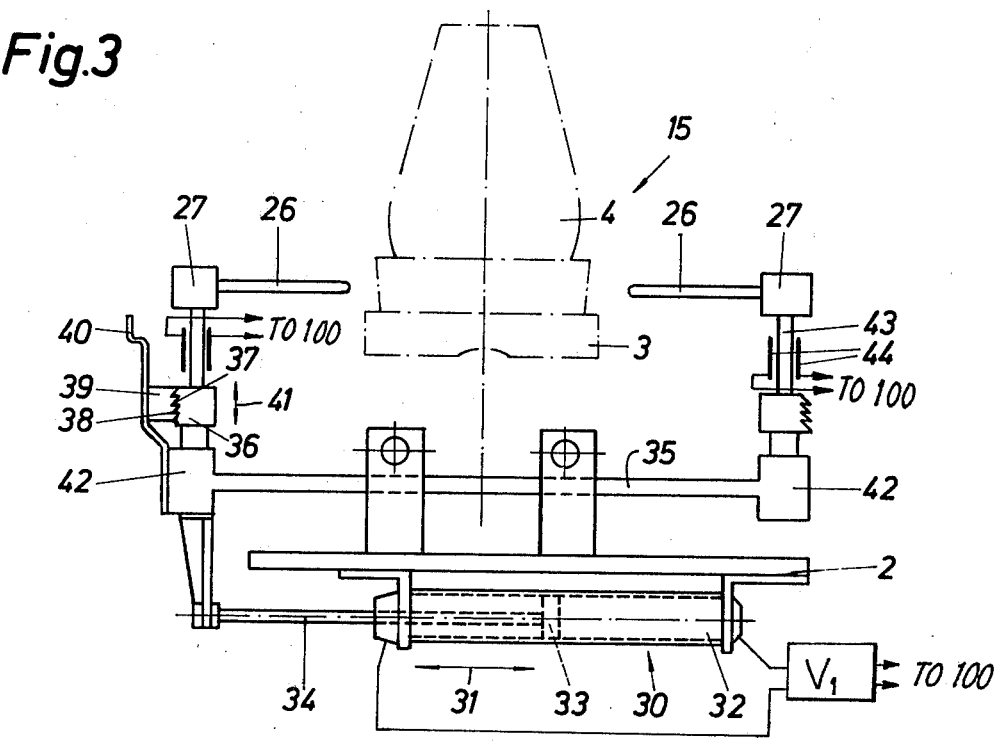
FIG. 3 is a front view of the measuring device for the toe jaw.

The lateral thrust measuring device 15 which is shown in FIG. 3 and which is used to determine the lateral release values for the toe binding 4b' is designed as follows. A hydraulic device which as a whole is identified by the reference numeral 30 is mounted on the frame 2, through which device the two rams 26 together with their mountings 27 can be adjusted from the left to the right and from the right to the left in direction of a double arrow 31 and in relationship to the longitudinal axis of the ski 3 and of the ski boot 4. A cylinder 32 is fixedly arranged on the frame 2 and has a piston 33 therein connected to a piston rod 34, the piston rod being adjustable in direction of the double arrow 31.

The supplying of hydraulic fluid, through which the adjustment is carried out, the control valving $V_1$, possible measuring devices or the like are known to the man skilled in the art, so that these details do not need to be discussed any further. The piston rod 34 is connected directly to the one (left in FIG. 3) mounting member 27 and by interpositioning a linkage 35 indirectly to the other (right in FIG. 3) mounting member 27. Thus an adjustment of the piston rod 34 effects simultaneously an adjustment of the two mounting members 27 with the associated rams 26. In this manner it is also assured that the effected release operation applied from the direction of force application by the one ram 26 will not be opposed by the other ram acting against this operation. For the purpose of adjusting to different thicknesses of ski boot soles, each mounting member 27 has a regulating flange 36 which can be adjusted in vertical direction. The individual regulating flanges 36 have a tooth system 37 on their outwardly facing surfaces, which tooth system can engage or disengage from a tooth system 38 of a counterpiece 39, which is biassed toward the tooth system 37 by a spring 40. The direction of vertical adjustment is indicated by a double arrow 41. In order to be able to carry out this adjustment, the individual mounting members 27 for the rams 26 are supported for limited movement in the vertical direction in bearing units 42.

The individual mounting members 27 each have a flexural member 43, which is restricted on both sides by a wire strain gauge 44. This arrangement permits the load on the individual wire strain gauges 44 to be reflected in one gauge being compressed and the other gauge being elongated. The change of the length of the wire strain gauges is measured in a conventional manner by a Wheatstone bridge, the actual values being fed to an electronic system and compared with predetermined desired values. As is generally known, the release values are a known function of weight, age, skiing capability, etc. of the skier, in most cases they are summarized in tables. A force selector 45 can be adjusted to a desired value 46 on a card index 47 or the like, which value is at the same time fed to the electronic control circuit 100. The comparison, the evaluation and the operation of the actual value of the force indication is accomplished by the electronic control circuit, which by itself is not the subject matter of the invention and therefore same is not discussed in any more detail. To start or stop the individual measuring operations, push bottons 48 are provided, luminous signals 49, 50 are provided for indicating the actual values relative to the desired values. The luminous signals 49 are green and show the correct values, whereas the luminous signals 50 are red and show the incorrectly adjusted release values. An appropriate inscription and/or the arrangement will facilitate a recognition that the values are too low or too high. Also an additional precaution can be taken by providing, when an incorrect adjustment occurs, an audible tone or horn signal. Of course, the illuminated arrangement can be entirely replaced with an audible sound system, wherein the symbols 49 and 50 represent speakers for emitting the audible sound.

Figure 4:
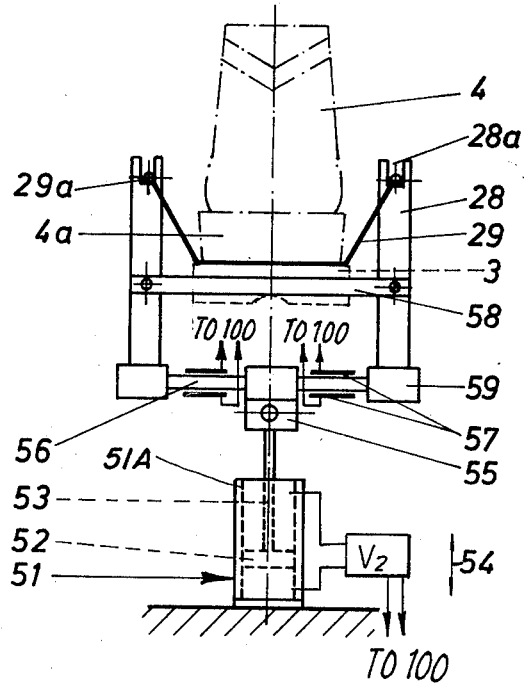
FIG. 4 is a rear view of the measuring device for measuring the load applied to a heel holder.

The arrangement which is shown in FIG. 4 functions as already mentioned, to determine the measured values for the frontal release. The heel tensioning means 29 on the two posts 28 grips under the heel 4a of the ski boot 4. The ski boot 4 is held above the ski 3, the ski 3 being fixed in its position to the frame 2 in a manner which will yet be described. A hydraulic mechanism 51 has a piston 52 reciprocally positioned therein with a piston rod 53 attached thereto. The piston rod 53 can be adjusted in the vertical direction of the double arrow 54 in the vertically aligned cylinder 51A. A carrier head 55 with a flexural member 56 is secured to the free end of the piston rod 53, which head supports the two posts 28 and on which they are fixedly arranged. By operating the hydraulic mechanism 51, the piston 52 with the piston rod 53 thereon is lifted and the carrier head 55 and the flexural member 56 are carried therewith as are the two posts 28. As a result, the heel 4a of the ski boot 4 is loaded by the heel tensioning means 29 and the actual values are fed in a similar manner to the electronic control circuit 100, are compared therein are evaluated and fed to the indicating device 49, 50. For this purpose, here again wire strain gauges 57 are provided, which extend parallel with respect to the horizontally extending flexural member 56. The operation of the flexural member 56 or of the wire strain gauge 57 corresponds to what has already been described with respect to the gauges 44. To be complete it is remarked that the individual posts 28 are provided at their upper free ends with relatively deep notches 28a to facilitate an automatic adjustment of the heel tensioning means 29 to differently thick skis 3 or different height stepping plates (not shown) on the heel holder (which cannot be seen in the drawing). The heel tensioning means 29 is made of a steel-band material, which is held at each of its two free ends in a bolt 29a which is in turn received in the notch 28a of the post 28. The two posts 28 are reinforced by a linkage 58. The flexural member 56 has two guide heads 59 thereon, on which the two posts 28 are mounted, which guide posts 59 are adjustable in the vertical direction (double arrow 54) in parts of the frame 2 which are not separately illustrated. The entire device for measuring the frontal release force is identified by the reference numeral 60 (FIG. 1).

Figure 5:
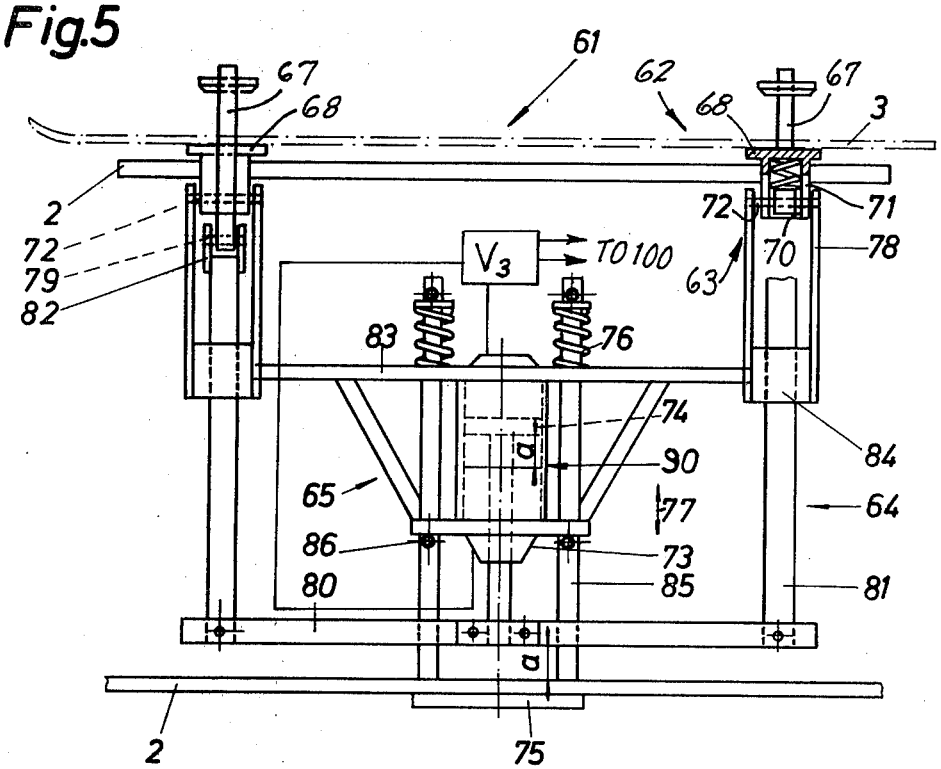
FIG. 5 is a side view of the ski hold-down mechanism.
Figure 6:
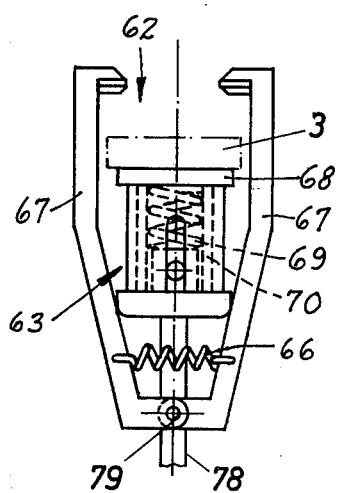
FIG. 6 illustrates a front view of a detail of the gripping system according to FIG. 5.

As one can take from FIG. 5, the ski hold-down device 61 for holding down the ski is arranged on the frame. The device 61 has a frame 64 and a lifting table 65, which can be adjusted in the vertical direction of the double arrow 77 both individually and also relative to one another by means of a hydraulic system 90. Gripping arms 67 (FIG. 6) are associated with the frame 64 and a table 68 for supporting the ski 3 is associated with the lifting table 65. The table 68 for supporting the ski 3 and the gripping arms 67 each form with the structural parts, which will yet be described, altogether a holding-gripping mechanism 62. The table 68 with the associated structural parts is identified as a lifting-pulling member 63. The hydraulic system 90 has in turn a cylinder 73 with a reciprocal piston 74.

The frame 64 has a horizontal crossbar 80 with vertically extending posts 81, each of which supports two lateral spaced plates 82 connected by a bolt 79, to which the gripping arms 67 are pivotally secured and which are biased by a spring 66. The lifting table 65 has also a horizontal crossbar 83, which supports holding heads 84 at its two laterally spaced free ends, which holding heads 84 are movable up and down guided along the posts 81. The holding heads 84 are each provided with two vertically extending and laterally spaced connecting plates 78, which each carry a pin 72 connected to and extending between their end regions remote from the holding heads 84. The pin 72 extends also through two elongated slots 71 in each of the tables 68, which slots lie spaced from one another in longitudinal direction of the ski. The table 68 is resiliently supported with respect to the pin 72 by the interpositioning of a spring 69 which is arranged in a recess 70 in the table 68.

A further pair of posts 85 is arranged on a base plate 75 secured to the frame 2, which pair of posts 85 function to stabilize the lifting table 65 relative to the frame 64; vertical movement of the lifting table 65 is resiliently resisted by means of its crossbar 83 in relationship to the pair of posts 85 and the interpositioning of springs 76. A movement of the lifting table 65 is limited in the downward direction by means of stops 86 on the pair of posts 85. The details of the holding-gripping mechanism 62 or of the lifting-pulling member 63 can be taken better from FIG. 6, wherein for a better understanding the left side of FIG. 5 shows in detail the design of the frame 64 with the gripping arms 67 and the right side shows better the structure of the lifting table 65 with the table 68 and the lifting-pulling member 63.

The device 61 for holding down the ski operates as follows. One must initially start from the position shown in FIG. 5 as the initial position. First, hydraulic fluid is fed to one side of the piston 74, wherein, when the cylinder 73 is stationary, the frame 64 with the gripping arms 67 is lowered, until the crossbar 80 rests on the base plate 75. Now the piston 74 or piston rod becomes stationary. Since the supply of hydraulic fluid is not interrupted, the cylinder 73 together with the lifting table 65 and thus also the table 68 is lifted. The mentioned springs 76 are used for the elastic support, which springs elastically support the lifting table 65 in relationship to the pair of posts 85 in the upward direction. In order to balance different ski thicknesses, a spring 69 is arranged within the recess 70 of the table 68 and the adjustment path is determined by the length of the slots 71 in the table 68. It is remarked only to be complete that the structure of the two holding-gripping mechanisms 62 is the same. After the ski 3 is fixed in the described manner in its position in relationship to the frame 2, the measuring operations described in connection with FIGS. 3 and 4 can be performed. After the actual values have been compared with the desired values, the necessary corrections made and a further check of the actual values has been determined to correspond with the desired values, the ski 3 is released by operation of the hydraulic system 90 in the opposite direction, after which the measurements with another pair of ski bindings 4a', 4b' can start.

ELECTRONIC CONTROL CIRCUIT

Figure 7:
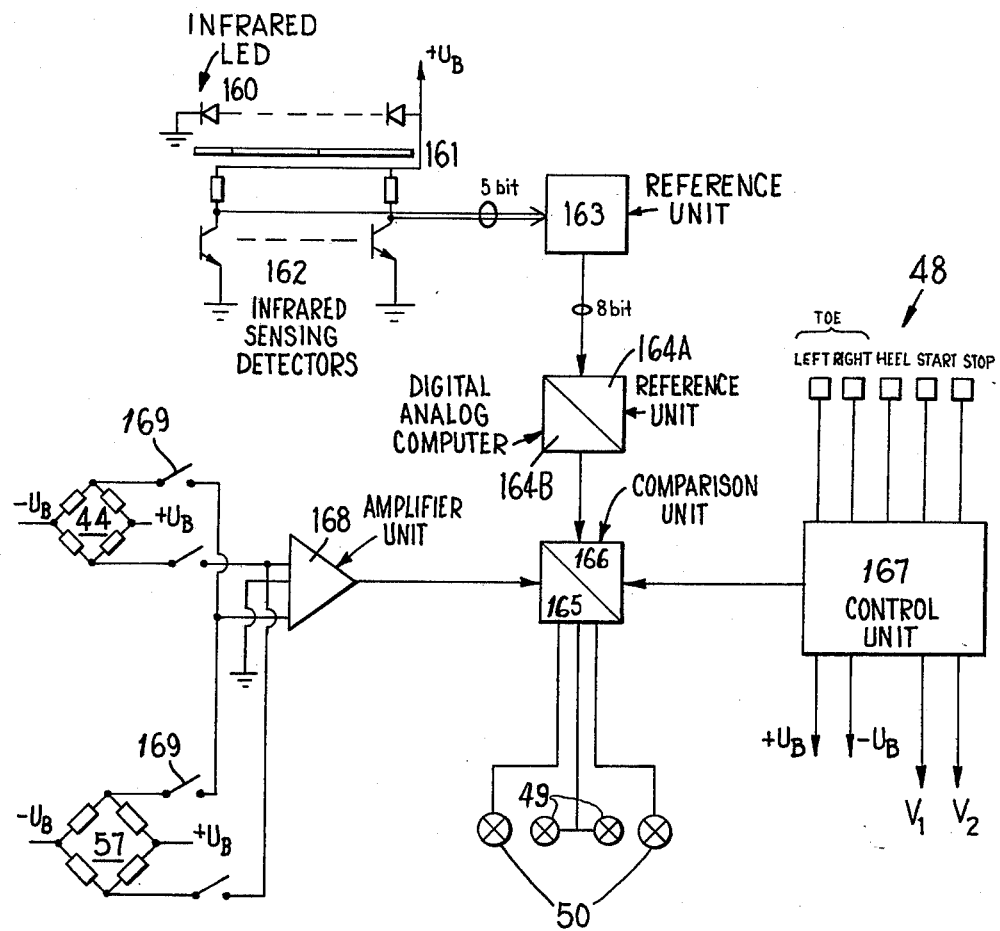
FIG. 7 is an electrical schematic diagram of the components of the electronic control circuit.

This part of the device has the task of preparing reference values corresponding with the position of the force selector 45, to amplify the force-proportional electrical signals which are produced by the wire strain gauge, to evaluate them and to compare them. Furthermore, the control of the sequence of movements occurs in this structural unit. Accordingly, the structural unit consists of the following function groups which are illustrated in FIG. 7:

Input unit 161, 162, 163.
Reference unit 163, 164A.
Digital-Analogue Converter 164B.
Comparison unit 165, 166.
Control unit 167.
Amplifier unit 168.

The input unit delivers 5-bit-addresses to the electronic fixedly programmed reference unit or storage 163. For this a code strip 161 which is rigidly connected to the force selector 45 is movably arranged between five light barriers, consisting of an infrared-LED 160 and infrared-sensing detectors 162. Depending on the position of the force selector 45 and, as a result, the code strip, a certain storage cell of the reference unit or storage 164A is addressed with a word length of 8-bits. After converting this 8-bit-data word in a digital-analogue converter 164B an analogue reference voltage which corresponds with the adjustment is fed into the comparison unit 165. Two voltage levels are formed in the comparison unit 165 in consideration of the tolerance voltage value from the comparison unit 166 and the reference voltage value from the 164. If the voltage maximum of the measured output voltage from the amplifier 168 lies at the moment of a binding release between these two voltage levels, then a "go" decision occurs by a lighting up of the signal lamps 49. If the measured output voltage lies below or above, this is signalled by the signal lamps 50 as being too low or too high. After the release operation has ended the sequence of movement is stopped through the control unit 167. The control unit continues to deliver the signals to feed the hydraulic valves $V_1$, $V_2$, and the relay contacts 169, which connects the corresponding expansion strain bridge to the input of the test amplifier 168. The selection is done by the buttons 48. The pressing of the start button starts the chosen sequence of movement. A stop button permits the immediate stopping of a release operation in each phase. The detailed structure of the individual function units need not be discussed any further, since they will be known to the man skilled in the art.

The invention is not limited to the illustrated exemplary embodiment. Various modifications can be carried out without departing from the scope of the invention. Thus it is for example possible to replace the hydraulic system with a pneumatic system. Also the relative adjustment of movable structural parts to one another can occur by utilizing, in place of toothed bars, for example, a gear, a worm gearing or the like.

It is furthermore preferable if the luminous members are arranged in the field of vision of the testing personnel facing toward the testing object. In such an arrangement, a separate viewing of the signal lamps at a control desk is not required.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a device for use in the adjustment of safety ski bindings which are mounted on a ski or for testing the adjustment of such safety ski bindings, said device comprising frame means having first means for fixedly holding at least one ski to said frame means and at least one adjustable loading member having a movable output member, said output member engaging and loading a ski boot connected to said ski by said safety ski binding, the improvement comprising wherein a plate assembly is provided for initially receiving said ski boot thereon and which is to be used in the testing procedure, said plate assembly having a first part fixedly connected to said frame means and a second part which is movably supported on said frame means against the force of a spring, said ski boot being located between said first and second parts, and wherein a translating mechanism having a center indicator thereon is connected to said movable second part so that said center indicator is displaced in proportion to the spacing between said first and second parts of said plate assembly, determined by the length of said ski boot, and relative to a location corresponding to a selected intermediate position between said safety ski binding, wherein means are provided for securing said ski to said frame means and in a position so that said center indicator is adjacent said selected intermediate position between said safety ski bindings, wherein means are provided for measuring the load applied to said ski boot following a transfer of said ski boot to a clamped in position between said safety ski bindings and producing measured value signals, and wherein comparison means having a desired value signal stored therein are provided for comparing said measured value signal with said desired value signal and producing a resultant signal and indicating means responsive to said resultant signal for indicating the result of said comparison.

2. The device according to claim 1, wherein said movable second part of said plate assembly is movable against the force of said spring and is engaged with the toe region of said ski boot.

3. The device according to claim 1 or 2, wherein said translating mechanism includes a carriage having a lateral thrust measuring device for measuring the lateral release forces, wherein said translating mechanism has a linkage hingedly connected at its one end to an extension of said carriage and its other end to said frame means, and wherein a further pivotal joint is provided intermediate the ends of said linkage, to which further pivotal joint is connected a further linkage having said center indicator thereon.

4. The device according to claim 1, wherein said selected intermediate position between said safety ski bindings is indicated by a mark on at least one of said ski boot and said ski, said mark being adjusted to said center indicator for the purpose of orientation of said ski relative to said first means and facilitating use of comparable desired values.

5. The device according to claim 1, wherein said translating mechanism has a transmitting ratio between the ski boot length supported on said plate assembly and said center indicator of 2:1.

6. The device according to claim 1, wherein said fixed first part of said plate assembly has a toothed bar and wherein said movable second part is movable with respect to said toothed bar in a direction parallel to the longitudinal axis of said ski boot and having means thereon operatively engaging the teeth of said toothed bar to hold said second part fixedly spaced from said first part, and wherein said toothed bar is movable in a vertical direction relative to said frame means, however, is supported nonmovably in the longitudinal direction of said boot and a lifting linkage means for effecting a disengagement of said second part from said toothed bar against the urging of a further spring to facilitate a movement of said second part toward said first part.

7. The device according to claim 1, wherein said adjustable loading member includes a ram movable transversely of the longitudinal axis of said ski and is provided for effecting a release of said safety ski binding, wherein intermediate said ram and said ski boot there is provided a flexural member having strain gauge means mounted thereon, wherein the changes of said strain gauge means caused by a flexing of said flexural member produce said measured value signals.

8. The device according to claim 7, wherein said ram acts in a horizontal plane for effecting a frontal release of a toe binding.

9. The device according to claim 7, wherein said ram acts in a vertical plane for effecting a rear release of a heel binding.

10. The device according to claim 1, wherein said indicating means includes at least one of light means and sound emitting means.

11. The device according to claim 1, wherein said first means comprises two spaced holding-gripping mechanisms spaced from one another in a direction parallel to the longitudinal axis of said ski, wherein each holding-gripping mechanism has two gripping arms which are biassed toward each other by a spring, said gripping arms including means facilitating a gripping of skis having different thicknesses and a central receiving of a selected one of said skis therein.

12. The device according to claim 11, wherein said holding-gripping mechanism has for supporting said ski during testing a table means which is adjustable in a vertical direction by a lifting-pulling member, wherein said table means is arranged with the interpositioning of a further spring on said lifting-pulling member, said further spring being arranged in a recess in said table means, said recess having an elongated slot in a wall thereof receiving a pin therein, said pin engaging one end of said further spring, said pin being connected to said lifting-pulling member so that said pin will compress said further spring to resiliently drive said table means toward said holding-gripping mechanism.

13. The device according to claim 11, wherein said first means includes a movable frame movable in a vertical direction, by a movably supported fluid actuated cylinder and reciprocal piston arrangement, wherein said movable frame is first lowerable with respect to said fluid actuated cylinder with said gripping arms for holding down the ski and after engagement of said frame with a base plate on said frame means, said cylinder will thereafter be lifted together with said table means on which said ski rests, relative to the then stationary piston.

14. The device according to claim 13, wherein between said frame and said table means still further springs are provided, the common force of which is smaller than the force of said fluid cylinder and reciprocal piston arrangement.

15. The device according to claim 1, wherein said indicating means include light signals arranged in the field of vision of the testing personnel facing toward the object to be tested.

* * * * *